2 Sheets--Sheet 2.
W. M. KNAPP.
Shifting Seats for Vehicles.
No. 151,405.
Patented May 26, 1874.
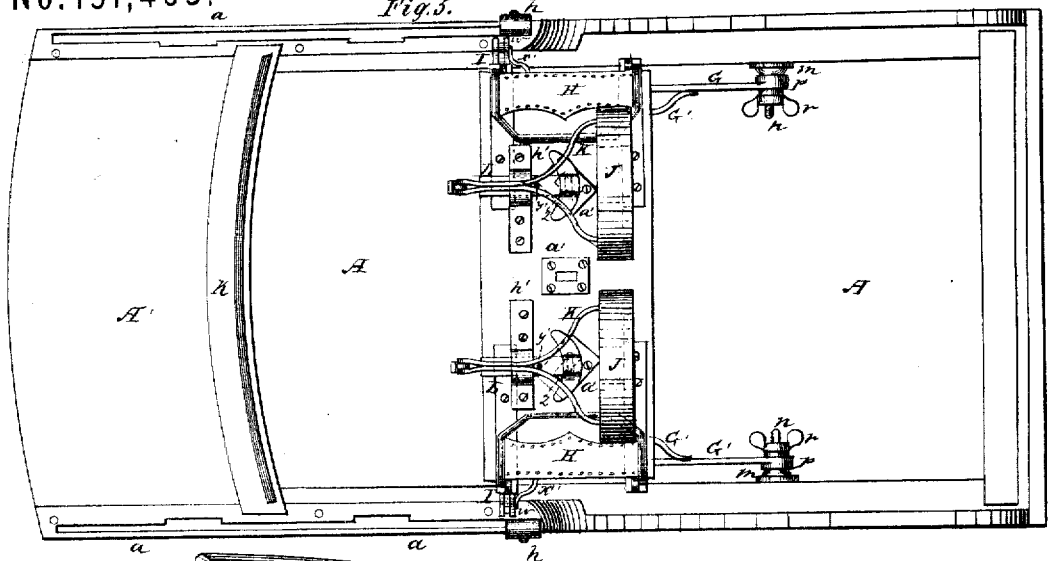
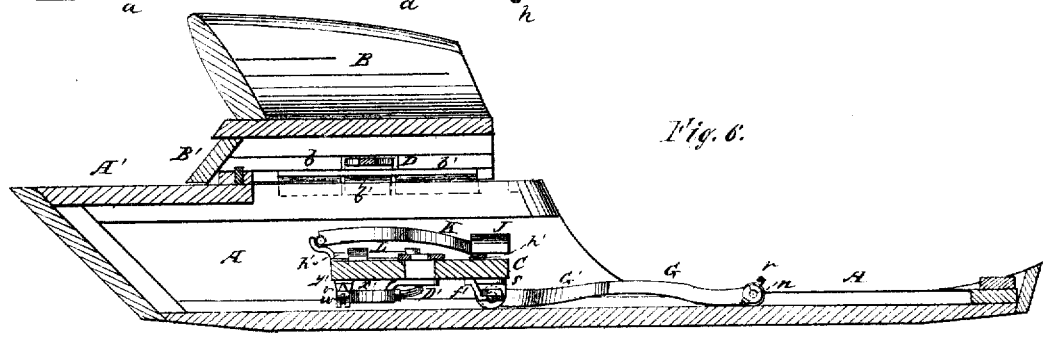
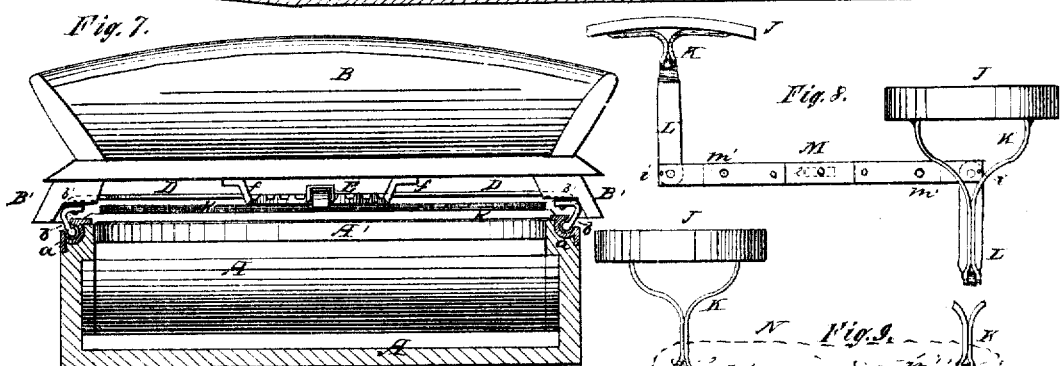
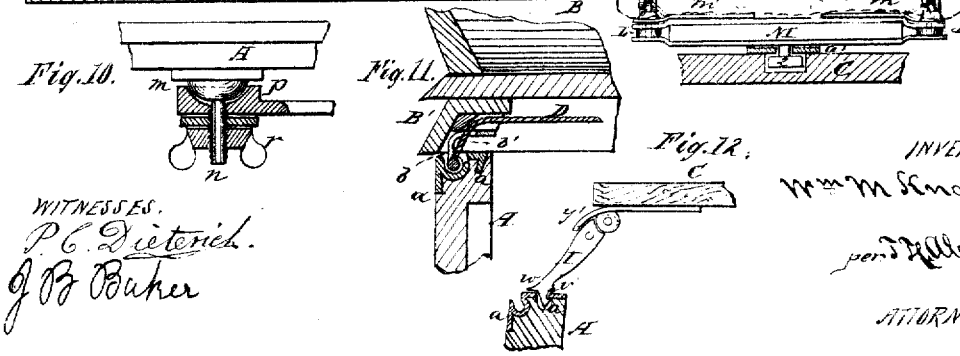
WITNESSES.
P. C. Dietrich.
J. B. Baker
INVENTOR.
Wm. M. Knapp
per J. H. Alexander
ATTORNEYS.
AM. PHOTO-LITHOGRAPHIC Co. N.Y. (OSBORNE'S PROCESS.)

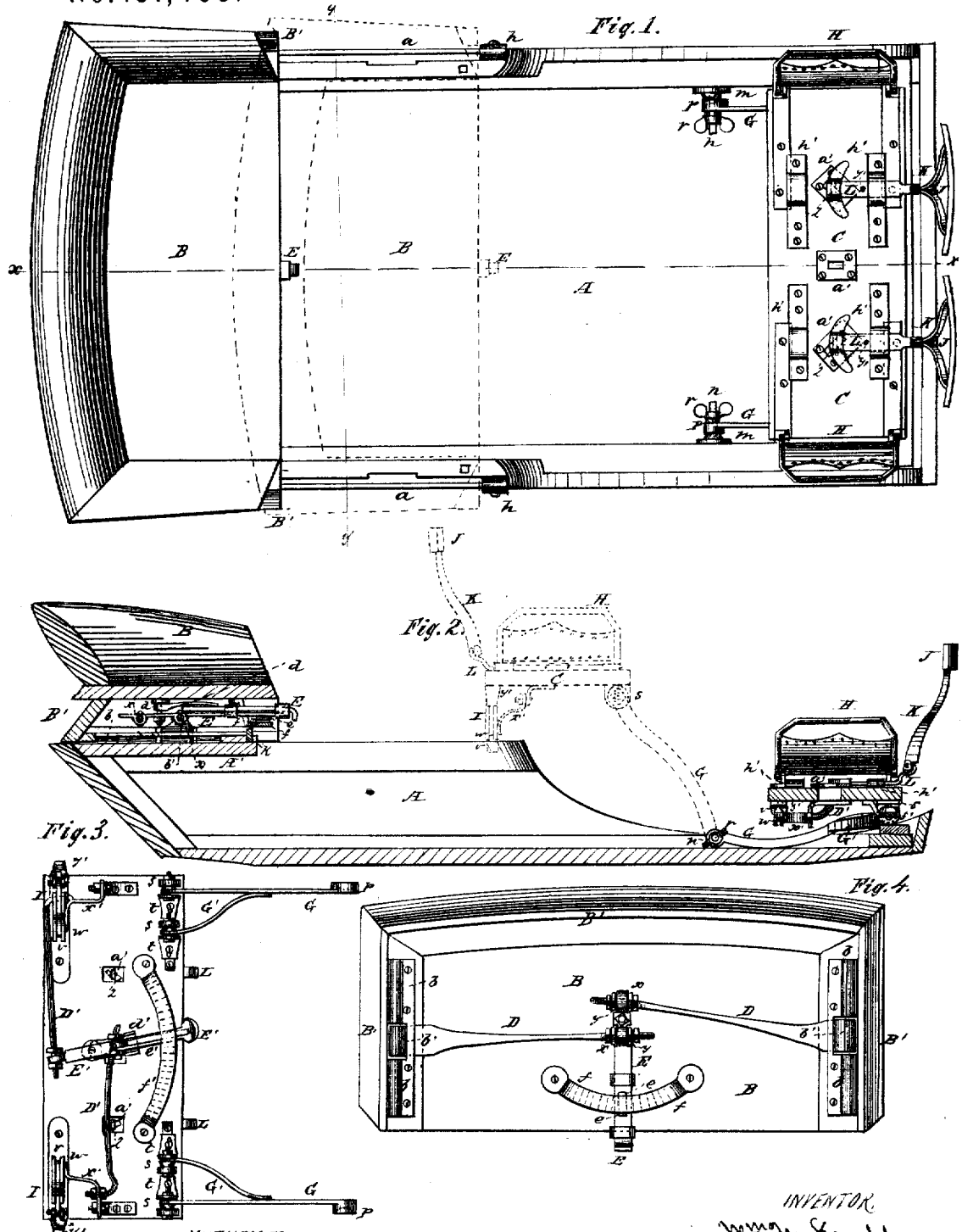

UNITED STATES PATENT OFFICE.

WILLIAM M. KNAPP, OF MUNCIE, INDIANA.

IMPROVEMENT IN SHIFTING-SEATS FOR VEHICLES.

Specification forming part of Letters Patent No. 151,405, dated May 26, 1874; application filed November 28, 1873.

*To all whom it may concern:*

Be it known that I, WILLIAM M. KNAPP, of Muncie, in the county of Delaware and State of Indiana, have invented certain new and useful Improvements in Shifting-Seat Buggies; and I do hereby declare that the following is a full, clear, and exact description thereof, reference being had to the accompanying drawings, and to the letters of reference marked thereon, which form a part of this specification.

My invention relates to that class of vehicles which are convertible at will into a double-seat carriage or single-seat buggy; and the nature of my invention consists especially in the devices for supporting and operating the main seat; also, in devices for locking the said seat firmly in any desired position, and for limiting the movement of the said seat and permitting its detachment, if necessary. It also consists in a device for preventing water, dust, or mud from passing in from behind under the seat when the vehicle is used as a single-seat buggy, thereby keeping the front seat and bottom of body clean. And it also consists in the mode of applying and operating the secondary or front seat, which may be set in three different positions; and also in certain details in the construction of the supports, backs, and arm-rests of said seat, all of which will be hereinafter more fully set forth.

In order to enable others skilled in the art to which my invention appertains to make and use the same, I will now proceed to describe its construction and operation, referring to the annexed drawings, in which—

Figure 1 is a plan view of the same. Fig. 2 is a central section on line *x x*, Fig. 1. Fig. 3 is a bottom-side up view of seat C. Fig. 4 is a bottom-side up view of seat B. Fig. 5 is a plan view, showing seat C only. Fig. 6 is a central section, showing seat C protected by seat B. Fig. 7 is a section through line *y y*, Fig. 1. Fig. 8 is a plan view of forked bar M. Fig. 9 is a side elevation of forked bar M. Fig. 10 is a detail view of the flanged cone, countersunk eye, screw-bolt, and thumb-nut. Fig. 11 is a detail section of seat B, showing dovetail, &c. Fig. 12 is a detail view of leg I, showing its adjustment on body A.

A represents the bed or body of the vehicle. B and C are the two seats. One of the objections to other vehicles of this class is that on the inside of the body there have always been more or less of projections of various kinds, which are apt to catch ladies' dresses, hoops, &c., and tear or otherwise injure the same. In the construction of my vehicle I form the interior of the sides of the body A perfectly smooth and even, without projections of any kind, so that in getting in or out of the vehicle there is nothing upon which ladies' garments can possibly catch. In the upper edges of the sides of the body A are formed dovetailed grooves *a a*, along the outer sides, as shown. These grooves may be formed of sheet or other metal, and attached in a rabbet along the top of the sides, or in any other suitable or convenient manner, so that the back or rear of the body may be paneled in forming light box, and being of shape to form miter with the panel, thereby preventing the panel from drawing up from the sides of the body. B' B' represent the seat-raisers, firmly attached in any suitable manner to the under side of the seat B. To the under sides of the seat-raisers, at each end of the seat, is attached a dovetailed or otherwise suitably-shaped slide, *b*, to fit and move in the grooves *a a* on the sides of the body A. Each of these slides *b* is slotted in the center for the passage of a hook or catch, *b'*, which is shaped similarly to the slides, and attached to or formed upon the outer end of a bar, D. The inner ends of the two bars D D form screw-rods, which pass through eyes or loops formed on the under side of a lever, E, and fastened to the same by means of nuts *x x*, which can be easily adjusted to the required length. The lever E is pivoted to the under side of the seat B, and the arms D D connect with the lever, one on each side of the pivot-point; hence, by turning the lever E to one side, the two hooks or catches *b' b'* are drawn inward and downward, and by turning the lever to the other side the hooks or catches are forced upward and outward. In the former case the seat is held rigidly to the carriage-body at whatever point it may be situated, and in the latter case the seat is loosened and may be moved back or forth as desired. In the grooves *a a* are slots at the front and rear to fit the catches or hooks *b'*, for additional security in fastening the seat B. It will be noticed that when the hooks or catches *b' b'* are drawn inward, they also move downward, giving them a better hold in the grooves *a a*. And they also draw the sides of the body A inward instead of spreading them apart, as is sometimes the case. The lever E is made in two parts, one part sliding in loops upon the other, so that when the seat is adjusted and fastened the sliding or outer part may be pushed inward and be entirely out of sight, while when required for use it can be drawn out, giving a better purchase for operating the fastening device. The lever E is pressed downward by means of a spring, *d*, so that a lug, *e*, on its under side will enter one of the spaces in a segmental rack-bar, *f*, attached to the under side of the seat and thus lock the lever in any position desired, and prevent rattling and noise. At the front end of each groove *a* is a stop, *h*, fastened by means of a screw, *i*. This stop forms a finish on the side of the body, and prevents the seat B from coming off from the body; and at the same time these stops can be readily removed, when it is necessary for any purpose to take off the seat. At the front edge of the top A' of the carriage-body is secured a rubber strip, *k*, which projects upward a suitable distance and extends entirely across the body. When the vehicle is to be used as a single-seat buggy, and the seat B is, therefore, moved forward to the desired position, the back-seat raiser B' bears tight against this rubber strip *k*, which, by this means, forms a packing to prevent rain, dust, or mud from passing in from behind under the seat. Though I prefer to use rubber for this purpose, I do not desire to confine myself to this material, as leather or other substance may be used and answer the same purpose. The front seat C is supported at its front edge by two legs, G G, one on each side, hinged to the under side of the seat and to the sill of the carriage-body. The lower hinge is formed in the following manner: To each sill of the carriage-body is attached a flanged cone, *m*, the apex of which forms or terminates in a screw-bolt, *n*. At the lower end of the leg G is formed a countersunk eye, *p*, to pass over the screw-bolt *n* and fit on the cone *m*, after which a washer is placed on the bolt and the whole tightened by means of a thumb-nut, *r*. By this construction of the hinge it can readily be tightened, if it should become loose by wear. The upper end of each leg has a brace, G', attached to its inner side. Both the leg and brace are hinged in the same manner, as just described for the lower end of the leg, to ears *s s*, attached to the under side of the seat C; but, in addition, the screw-bolt on the end of each cone passes through an L-shaped slide, *t*, which forms a second bearing for the hinge, and which moves up as the hinge is tightened. The rear part of the seat C is, when in use, supported upon two hinged legs, I I, one at each end of the seat, and said legs are connected to a lever, E', pivoted on the under side of the seat, and this lever locked in any position desired by means of a spring, *d'*, lug *e'*, and segmental rack-bar *f*, all in precisely the same manner, as above described, for the lever E and arms D D, which operate the fastening device for the seat B. The lower end of each of the hinged legs I forms, or is provided with, an inward and downward projecting tooth, *v*, and an outward-projecting claw, *w*. When the seat C is to be used as a front seat to form a double-seat carriage, the legs I I are spread as far as possible—that is, till they come in contact with stops *y y*, as shown, when their teeth *v v* are inserted in holes made in the upper edges of the body side pieces, or rather in the metal covering or lining of the same. The seat C is thus supported by the legs G G and I I, but is not held rigidly to the carriage-body, inasmuch as the rear part of the seat can slip up and down. By, however, turning the lever E' in such a direction as to draw the legs I I inward for a very short distance, their teeth will bear against the under side of the metal covering or lining spoken of, while the claws *w w* will bear against the top of the same, thus forming a perfect lock and holding the seat rigidly in its position. When the seat C is not to be used, the legs I I, the rest-backs, and arm rails or rests are folded, and the seat is let down in the bottom of the carriage, under the seat B, which is then moved forward; or the seat C may be thrown forward so as to rest on the bottom at the front end against the dash, forming a low and comfortable seat for children, with rest-backs reversed. H H represent the arm-rests or side pieces of the seat C. They are hinged to the seat in any suitable manner, so as to fold down on the seat when the seat is not in use. The main part of this arms-rest or side piece is formed of a metal plate perforated along its upper and lower edges, so that the cushion or upholstering may be easily attached to it. J J represent the backs for the seat C, each of which is attached to a forked standard, K, and this is hinged at its lower end to a horizontal bar, L, that is movable on the seat C. The front end of each bar, L, has on its under side a T-shaped pin or projection, *z*, which fits into a slot in a plate, *a'*, embedded in the top of the seat C. This plate *a'* is so arranged that when the bar L is turned across the seat C in either direction, the pin *z* cannot come out of the slot in the same; but by turning the bar toward a corner it can readily be slipped out. The bar L, when placed across the seat in either direction, is held by means of a spring-catch, *h'*, which prevents any rattling or jumping of the back. The backs J J are thus made reversible independent of each other, and can be changed in a moment, as may be desired. The bars L L, instead of being connected as described, to the plates *a' a'*, may be hinged in the horizontally-forked ends of a bar, M, and this bar provided on its under side in the center with the T-shaped pin placed in a slotted plate in the center of the seat. On the upper side of the bar M at each end is a spring, $m'$, with a pin, $i'$, to enter corresponding holes in the pivoted ends of the bars L to lock the same. In this case either back may be reversed independent of the other, or both be reversed at one time. When the bar M is used the cushion N should be attached to it so as to turn also when the bar is turned. By means of the hinges connecting the legs G with the sills of the body, the front seat may be taken out without the use of tools. The washers used have one straight side to fit on a flat part of the bolt to prevent the nut from turning off when the seat is shifted. The folding legs I I are provided with a brace, $x'$, which supports the joint, and forms a foot for the seat C when under the seat B or when used as a child's seat. The bars L L may be provided with lugs $y'$, which fit in holes in the plates $a'$ to keep the seat-backs in position, thereby dispensing with the spring-catches $h'$.

I do not claim, broadly, a carriage with a sliding main seat, and a movable second seat adjustable in three positions, so as to be used as a child's seat or driving seat, or disused entirely, as I am aware such carriages have been made before.

I am aware that a seat has been made to slide on rails or bars of metal attached to the body or sides of the carriage, but these were exposed to view from the top and sides more than in my invention, and none were dovetailed grooves or slides, by the use of which I obtain a perfectly secure slide, as it cannot possibly get out of the grooves. This manner of attaching seats prevents marring any of the outside surfaces of the body in the least, as the seat passes clear of the body, allowing the back or deck to be closed in, and, in connection with the strip of rubber or other suitable material, form a perfectly tight box at the rear end of the body.

Having thus fully described my invention, what I claim as new, and desire to secure by Letters Patent, is—

1. The combination of the catches $b'$ $b'$, arms D D, with nuts $x$ $x$, rubber washers $y$ $y$, lever E, spring $d$, lug E, and rack-bar $f$, all constructed substantially as and for the purposes set forth.

2. The lever E, for operating the fastening device for a carriage-seat, the lever being made in two parts to slide one upon the other, as described, and for the purposes set forth.

3. The elastic strip $k$ on the front edge of the deck-panel of body A, substantially as and for the purposes set forth.

4. The combination with the seat-leg G and carriage-body A, of the cone $m$ with screw-bolt $n$, countersunk eye $p$, and thumb-nut $r$, substantially as and for the purposes set forth.

5. The slotted L-shaped slide $t$, in combination with the hinges described for connecting the leg G, and seat C, as and for the purpose specified.

6. The hinged legs I I, provided with teeth $v$ and claws $w$, substantially as and for the purposes set forth.

7. In combination with the seat C and carriage-body A, hinged legs I, for supporting the seat upon and locking it to the body, substantially as set forth.

8. The combination of the hinged legs I I, constructed as described, the connecting-rods D' D', lever E', spring $d'$, lug $e'$, and rack-bar $f'$, all substantially as and for the purposes herein set forth.

9. The back-supporting bars L, provided with T-shaped pins $z$, in combination with the slotted plates $a'$ and lugs $y'$, for the purposes set forth.

10. The spring-catches $h'$ on the seat C, to operate in combination with the bars L, all combined substantially as and for the purposes set forth.

11. The connecting-bar M for connecting the bars L L, so that the cushion and both backs may be reversed by one movement, as set forth.

In testimony that I claim the foregoing as my own I affix my signature in presence of two witnesses.

WM. M. KNAPP.

Witnesses:
T. H. ALEXANDER,
C. ALEXANDER.